US006601573B1

(12) United States Patent
Frank

(10) Patent No.: US 6,601,573 B1
(45) Date of Patent: Aug. 5, 2003

(54) METHOD FOR DETECTING FAILURE OF A PUMP ASSEMBLY IN A PUMP MODULE

(75) Inventor: Kurt Frank, Schelmenwasen (DE)

(73) Assignee: Robert Bosch GmbH, Stuttgart (DE)

(*) Notice: Subject to any disclaimer, the term of this patent is extended or adjusted under 35 U.S.C. 154(b) by 55 days.

(21) Appl. No.: 09/786,539

(22) PCT Filed: Jul. 5, 2000

(86) PCT No.: PCT/DE00/02133

§ 371 (c)(1), (2), (4) Date: Sep. 6, 2001

(30) Foreign Application Priority Data

Jul. 7, 1999 (DE) ........................................ 199 31 266

(51) Int. Cl.[7] ......................... F02D 41/22; G01M 19/00

(52) U.S. Cl. ....................... 123/683; 73/118.1; 123/690

(58) Field of Search ................................ 123/672, 673, 123/679, 683, 681, 690, 332, 333, 295; 701/103, 104, 107; 73/118.1

(56) References Cited

U.S. PATENT DOCUMENTS

| | | | |
|---|---|---|---|
| 4,726,335 A | 2/1988 | Braeuninger | |
| 4,903,670 A | 2/1990 | Bauder | |
| 2001/0032622 A1 * | 10/2001 | Joos et al. | 123/497 |

FOREIGN PATENT DOCUMENTS

| | | |
|---|---|---|
| EP | 0 316 164 A | 5/1989 |

OTHER PUBLICATIONS

Patent Abstract of Japan vol. 013, No. 036 (M–790), Jan. 26, 1989 & JP 63 246446, Oct. 13, 1988.

Patent Abstracts of Japan vol. 06, No. 065 (M–124) Apr. 24, 1982 & JP 57 005521 A, Jan. 12, 1982.

* cited by examiner

*Primary Examiner*—Tony M. Argenbright
*Assistant Examiner*—Arnold Castro
(74) *Attorney, Agent, or Firm*—Michael J. Stiker

(57) ABSTRACT

The invention relates to a method for detecting selection of a pump assembly (25, 32), for instance a fuel pump assembly, in which at least two pump assemblies are provided. By means of a control unit (12), the lambda signal is scanned continuously by means of lambda probes (21). As a function of the lambda signal ascertained, the maximum fuel injection quantity is limited to the supply quantity of a fuel pump assembly (25, 32), and simultaneously a limitation of the air quantity to the air quantity corresponding to the maximum fuel injection quantity is effected. The limitation of the maximum fuel injection quantity and of the associated air quantity is effected via a throttle valve element (13.1), which is triggered by the control unit (12).

10 Claims, 1 Drawing Sheet

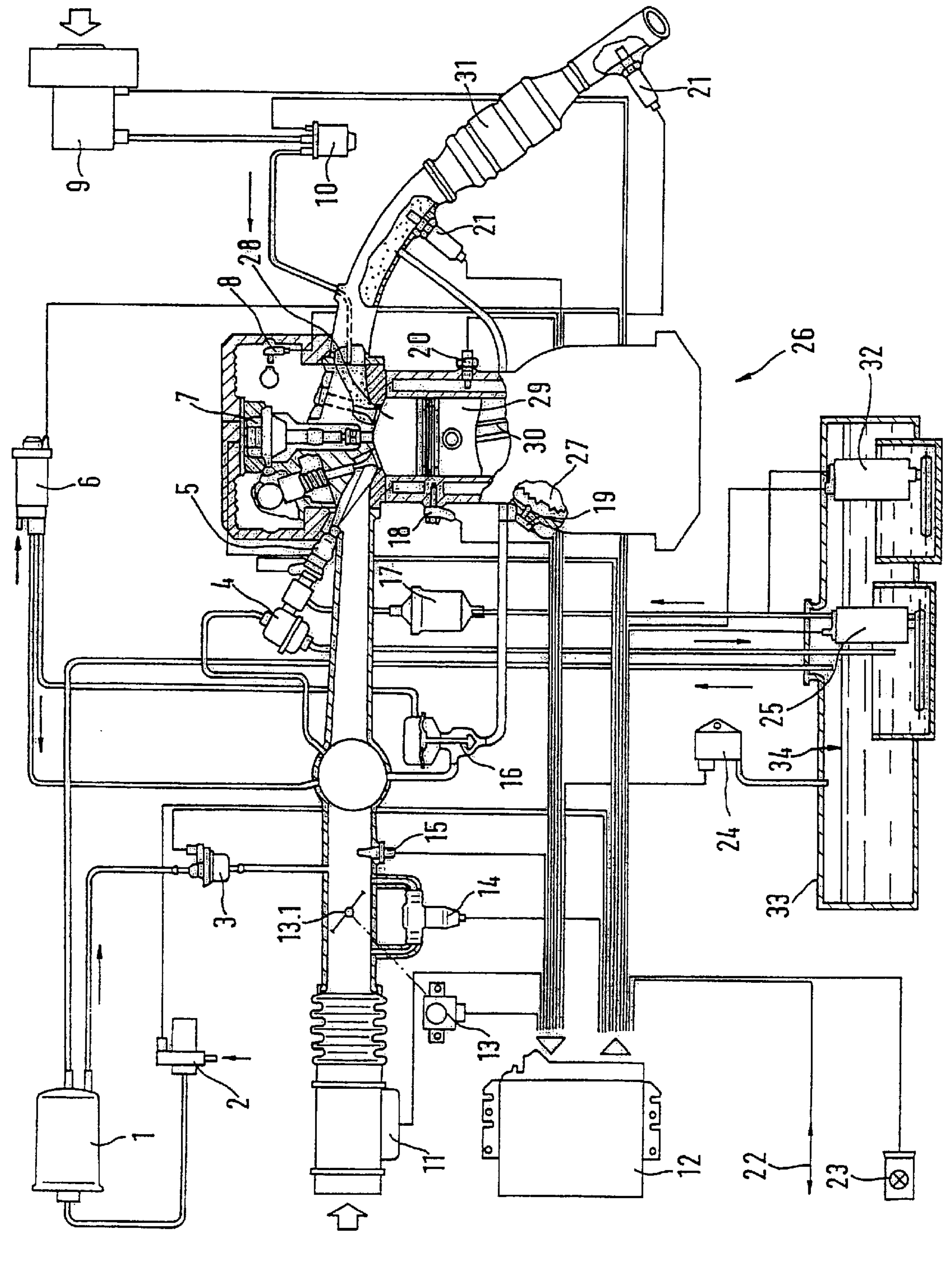
1
2
3
4
5
6
7
8
9
10
11
12
13
13.1
14
15
16
17
18
19
20
21
22
23
24
25
26
27
28
29
30
31
32
33
34

METHOD FOR DETECTING FAILURE OF A PUMP ASSEMBLY IN A PUMP MODULE

BACKGROUND OF THE INVENTION

The present invention relates to a method for detecting failure of a pump assembly, such as a fuel pump assembly in a fuel pump module, which includes a plurality of fuel pump assemblies.

In fuel pump modules, as a rule a fuel pump assembly, for instance an electric fuel pump, is used, which supplies the internal combustion engine with fuel. In modern applications, the supply quantity of a single fuel pump assembly can be sufficient to meet the fuel demand of an engine with normal engine consumption. In vehicles with very high-powered engines and very high engine consumption, two or more fuel pump assemblies, such as electric fuel pumps, can be provided in the fuel pump module in order to meet the greater engine consumption quantity in the full-load situation, for instance.

In fuel pump modules equipped in this way, the failure of one fuel pump assembly can mean that because of inadequate fuel supply in the full-load situation, the impermissibly leaned-down engine will overheat and can lead to a catalytic converter fire, since unconsumed fuel passes through the outlet valves directly into the catalytic converter, which is very hot. This occurs especially at lambda values of 1.2 to 1.5, and in the worst case it can lead to the complete destruction of the engine.

SUMMARY OF THE INVENTION

The method according to the invention makes it possible to utilize the continuously detected lambda signal in the exhaust system to ascertain the failure of one of a plurality of fuel pump assemblies, and it protects the engine to be supplied with fuel against overheating and more extensive damage, as well as protecting the catalytic converter, included in the exhaust system, against catalytic converter fire from ignition of uncombusted fuel. Since the requisite sensors for ascertaining the lambda signal, the load state, the rpm, and other engine-specific parameters, such as engine temperature, tendency to knocking, and air temperature, are already present, implementing the invention in an engine requires merely modifying the control program for the control unit.

Along with the selection detection, which in this way is simple to implement—while dispensing with additional structural components—for a fuel pump assembly, the safety shutoff of engine-specific different types and model series of internal combustion engines can be implemented and employed.

In an advantageous feature of the method of the invention, the lambda signal is ascertained continuously upstream of the catalytic converter disposed in the exhaust system and is reported back to the control unit by means of the engine management system. The limitation of both the maximum fuel injection quantity and the associated air quantity can be effected in the full-load situation for instance at maximum rpm, where the engine fuel demand is maximal, and leaning of the fuel-air mixture dictated by the failure of a pump assembly would necessarily cause overheating and more extensive engine damage within the briefest possible time.

The limit values for the lambda signal can be ascertained engine-specifically depending on how the engine management system is used. By means of simple software changes, the lambda limit value can be adapted to various requirements in the most various model series of current engines.

In a preferred variant of the method of the invention, the tripping of the limitation of the maximum fuel injection quantity and of the associated air quantity can already be effected whenever the rpm amounts to 80% of the maximum rpm or the throttle valve is opened at least 80% or more, which is always the case in the full-load situation in an internal combustion engine. A further peripheral condition for tripping the limitation of the maximum fuel injection quantity and the associated air quantity can be specified by providing that the throttle valve remains in a constant throttle valve position for a preselectable period of time $\Delta t$; the full-load conditions are thus not interrupted by any overrunning shutoff, and thus the full-load conditions prevail for a constant period of time. In that case, failure detection for one of the fuel pump modules is absolutely compulsory, because overheating can occur fastest at full load.

Along with the indicated limitation of the maximum fuel injection quantity and the associated air quantity, more—extensive engine damage under conditions of permissible mixture leaning can also be prevented by providing that via the control unit, all the fuel pumping by the fuel pump module is shut off, so that the engine necessarily comes to a stop.

Within the engine management system of the invention, the throttle valve is controlled by the control unit via the throttle valve transducer, as a function of the lambda signal ascertained by the lambda probes, so that at superstoichiometric lambda values, either a limitation of the maximum fuel injection quantity and associated air quantity, or a shutoff of all the fuel pumping, takes place.

BRIEF DESCRIPTION OF THE DRAWINGS

The invention will be described below in further detail in conjunction with the drawing:

The sole drawing FIGURE shows an engine management system with a fuel pump module, which is provided here by way of example with two electric fuel pumps disposed in the fuel tank.

DESCRIPTION OF THE PREFERRED EMBODIMENTS

In the variant embodiment of the engine management system shown in FIG. 1, an activated charcoal container 1, which filters the fuel vapors, is built-in between a shutoff valve 2 and a fuel tank 33. Via a regulating valve 3, the activated charcoal container 1 furthermore communicates with the intake tube, which downstream of a filter element holds a throttle valve 13.1 that is actuatable by means of a throttle valve transducer 13.

Fuel is pumped via a feed line, which leads from a fuel pump assembly 25 to the injection valve 5 above the combustion chamber 28 into a cylinder of the internal combustion engine 26. Besides the fuel pump assembly 25, the fuel tank 33 contains one further fuel pump assembly 32, which also pumps fuel to the engine 26. The fuel pump assemblies 25, 32 are surrounded by fuel in accordance with the fuel level 34 that prevails in the tank 33; suction jet pumps can be provided in the tank 33, which deliver the fuel, arriving from a return line from the fuel pressure regulator 4, to the fuel pump assemblies 25, 32, which in turn can be surrounded by cup-shaped containers.

A fuel filter element 17, whose filter element is easily replaced, is integrated with the feed line from the tank 33 to the injection valve 5. The feed line from the further fuel pump assembly 32 can discharge into the feed line from fuel pump assembly 25 to the injection valve 5. By way of the two pump assemblies 25, 32 shown as an example here, it is also possible for groups of two, four or more cylinders each of the engine 26 to be supplied with fuel.

The engine 26, above the combustion chamber 28, includes an ignition coil 7; next to it is a phase sensor 8. A knocking sensor 18 and an engine temperature sensor 20 are associated with the cylinder 28 of the engine 26. The flywheel 27 of the engine 26 has an rpm sensor 19 assigned to it, with which the rpm of the engine 26 can be ascertained. By way of the crankshaft, which has multiple offsets and is not shown here, the pistons 29 are connected to the flywheel 27 via the connecting rod 30.

An exhaust pipe 31, with lambda probes 21 let into it upstream and downstream of the catalytic converter, is associated with the outlet of the respective combustion chamber 28 of the engine 26. An incoming air line discharges into the exhaust pipe 31 from a secondary air valve 10, which in turn communicates with a secondary air pump 9, which mixes additional air, if necessary, with the exhaust gas upstream of the catalytic converter.

The intake tube 31, extending from the air filter element to the injection valve 5, is provided downstream of the air filter element with an air flow rate sensor 11, downstream of which there is a throttle valve 13.1 connected to a throttle valve transducer 13. With the electrically actuatable throttle valve 13.1, more or less air required for combustion is carried into the combustion chambers 28 of the engine 26, depending on the load status of the engine 26. The conduits of an idling adjuster 14 discharge on both sides of the electrically actuatable throttle valve 13.1 let into the intake tube; when the throttle valve 13.1 is closed, or in other words is standing vertically in the intake tube, the idling adjuster assures idling of the engine 26. Downstream of the idling adjuster 14, there is an air temperature sensor 15 in the intake tube; it measures the temperature of the incoming combustion air, since the air volume is dependent on its temperature.

Downstream of the air temperature sensor 15 is an exhaust gas recirculation valve 16 with which exhaust gas from the engine 26 can be returned to the intake tube, for instance for cold starting in order to preheat the combustion air.

The engine management is effected via a control unit 12, with which all the sensors, that is, the air temperature sensor 15, knocking sensor 18, engine temperature sensor 20, and both lambda probes 21 and the rpm sensor 19 and other sensors, not listed individually here, are connected. The control unit 12 also controls the throttle valve 13.1 as well as the fuel pump assemblies 25 and 32 in the tank 33 and also has both a diagnostic interface 22 and a diagnostic lamp 23. Via a differential pressure sensor 24, the pressure in the tank 33 is reported back to the control unit 12, and by means of the transducer 13 the position of the throttle valve 13.1 in the intake tube is fed back. The rpm, the knocking behavior, and the engine temperature are also reported back to the control unit 12 via the sensors. By means of a pressure setter 6, the engine management system is adapted to ambient pressure conditions.

The fuel pump module assigned to the tank 33, which in the present case has two fuel pump assemblies 25 and 32, also communicates with the control unit 12 via signal lines; the two fuel pump assemblies 25 and 32 can be triggered via the control unit 12. The pressure in the tank 33 can be monitored by means of the differential pressure sensor 24. By means of the method of the invention, which can be implemented in a simple way as a control program in the control unit 12 without major expense for equipment, the sensors already present in the engine management system can be used for detecting selection of a fuel pump assembly 25 or 32 in the fuel pump module and for speed regulation or shutoff of the engine 26, without requiring major additional expense for equipment.

The selection detection of one of the fuel pump assemblies 25, 32 is detected by the detection of the lambda signal by means of the lambda probe 21 upstream of the catalytic converter in the exhaust pipe 31. If impermissible leaning down of lambda values occurs in the range from 0.8 to 0.9 in the full-load situation, then lambda assumes values between 1.2 and 1.5, which can cause overheating of the engine 26 and a catalytic converter fire from uncombusted fuel. If via the sensors 19 an opened throttle valve position of at least 80% opening in the full-load situation promotes an increase in the lambda value, then by means of the control unit 12, the maximum injection quantity at the injection valves 5 and the associated air quantity are immediately limited to the fuel supply quantity of one of the fuel pump assemblies 25 or 32.

With this provision, the engine power does decrease, since the full fuel demand required in the full-load situation can no longer be met, but the engine 26 is also protected against more-extensive overheating and the resultant consequent damage, such as piston seizing caused by from evaporation of the oil film located on the walls of the combustion chamber. As an alternative to limiting the maximum injection quantity and the associated air quantity, the entire fuel pumping by the fuel pump module can also be shut off by the control unit 12, which must necessarily cause the engine 26 to come to a stop.

Along with the parameters detected by the sensors of the engine management system, such as the engine rpm and the position of the throttle valve 13.1 in the intake tube, the sensors can also ascertain that a constant opening of the throttle valve 13.1 is present over a preselectable period of time. A degree of opening of the throttle valve 13.1 of approximately 80% in the intake tube, as well as the attainment and maintaining of 80% of the maximum rpm, can be used as tripping parameters for the limitation of fuel delivery and of the associated air quantity to the engine 26.

Depending on the model series and type of engine 26 controlled by the engine management, the engine management system can be custom-tailored; in this respect it does not matter how many fuel pump assemblies 25 and 32 the fuel pump module contains and how many such assemblies are to be controlled by the control unit 12. By making only slight adaptations of the control programs in the control unit 12, the selection detection and the safety shutoff can be adapted engine-specifically, since there is no need to change the structural components that are already present anyway.

What is claimed is:

1. A method of detecting failure of a pump assembly in a pump module having at least two pump assemblies, the method comprising the steps of continuously scanning a lambda value via lambda probes by a control unit; limiting a maximum injection quantity to a supply quantity of a fuel pump assembly; simultaneously limiting an associated air quantity to an air quantity corresponding to the maximum fuel injection quantity; effecting the limiting of the maximum fuel injection quantity and allowable injection quantity via a throttle valve element.

2. A method as defined in claim 1; and further comprising scanning a lambda signal upstream of a catalytic converter disposed in an exhaust pipe.

3. A method as defined in claim 1; and further comprising effecting the limiting of the maximum injection quantity and the associated air quantity in a full-load situation.

4. A method as defined in claim 1; and further comprising effecting the limiting of the maximum injection quantity and the associated air quantity at maximum rpm of an internal combustion engine.

5. A method as defined in claim 1; and further comprising ascertaining a limit value for a lambda signal engine-specifically.

6. A method as defined in claim 1; and further comprising opening a throttle valve at least 80% for tripping the limiting of the maximum fuel injection quantity.

7. A method as defined in claim 4; and further comprising amounting the rpm amount to at least 80% of a maximum rpm, for tripping the limiting of the maximum fuel injection quantity and the associated air quantity.

8. A method as defined in claim 1; and further comprising maintaining constant a position of a throttle valve in an intake tube for tripping the limiting of the maximum quantity and the associated air quantity.

9. A method as defined in claim 8; and further comprising maintaining the throttle valve in a constant throttle valve position for a preselectable period of time.

10. An engine management system, comprising a control unit for detecting a selection of a fuel pump assembly in a fuel pump module; a throttle valve controlled by said control unit via a throttle valve transducer as a function of a lambda signal ascertained by lambda probes; and means for effecting at superstoichiometric lambda values, a limitation of a maximum fuel injection quantity and an associated air quantity.

* * * * *